Patented Apr. 17, 1945

2,374,149

UNITED STATES PATENT OFFICE 2,374,149

METHOD OF PREPARING FURAN

Gerald M. Whitman, Claymont, Del., assignor to E. I. du Pont de Nemours & Company, Wilmington, Del., a corporation of Delaware No Drawing. Application March 13, 1943, Serial No. 479,151

7 Claims. (Cl. 260—345)

This invention relates to the catalytic decarbonylation of aldehydes and more particularly to the manufacture of furan from furfural.

One of the commonly used methods for preparing furan on a laboratory scale is the pyrolysis of furoic acid which in turn is prepared from furfural by the Cannizzaro reaction. In this reaction the furfural is treated with alkali to give an equimolecular mixture of furoic acid and furfuryl alcohol. Hence the preparation of furan from furfural by this route involves two inconvenient batch processes and the maximum possible conversion of furfural to furan is 50%. One other method for the preparation of furan is by passing furfural vapor alone or with hydrogen over a nickel catalyst (Rend. Acad. Lincei 15, 610 (1906); Chem. Zentr. 1907, I, 570; Ber. 53, 114 (1920)). The use of nickel catalysts for the decarbonylation of furfural leads to extensive degradation of the furfural to carbon and undesired gaseous and liquid products, and as a result only small yields of furan are obtained and catalyst deactivation is rapid. Furan has also been prepared by passing furfural vapor through fused caustic alkali or through soda lime (J. Am. Chem. Soc. 54, 2530 (1932)). In these methods the alkaline reagent is exhausted by conversion to carbonate so that the process is not catalytic but involves replenishment of the alkaline reagent. Although high yields of furan have been reported over short periods of operation, the conversion per pass is low and decreases as the alkaline reagent becomes more nearly exhausted. These processes, in common with others described in the prior art, are obviously too inefficient and expensive for use on a large scale.

It is an object of this invention to provide an improved and commercially practical method for preparing furan. It is a further object to provide a continuous process for preparing furan from furfural in high conversions and yields. Another object is to furnish an improved catalytic method for preparing furan from furfural. Other objects will be apparent from the following description of the invention.

The above and other objects described hereinafter are accomplished by passing a vapor mixture of furfural and steam over a catalyst heated above 200° C., said catalyst containing as an essential component a dehydrogenating oxide, a mixture of dehydrogenating oxides, or a dehydrogenating oxide chemically combined with a more acidic oxide than zinc oxide, such as an oxide of vanadium, chromium, tungsten, molybdenum, or uranium. The preferred catalysts used in the practice of this invention are those comprising as an essential component a mixed chromite of zinc and manganese, or zinc and iron, or chromites of the ferrous metals promoted with cadmium or tin.

By a dehydrogenating oxide is meant an oxide which preferentially dehydrogenates alcohols at ordinary pressures and elevated temperatures with the formation of aldehydes rather than one which dehydrates the alcohols with the formation of olefins.

In the preferred practice of the invention a mixture of one volume of furfural vapor with five volumes of steam is passed through a vertical tube containing as a catalyst a mixed chromite of zinc and manganese in which the manganese chromite comprises about 20 mole per cent of the base metal chromites. Equally satisfactory results are obtained by the use of zinc chromite containing 10 to 20 mole per cent of iron. The steam-furfural mixture is passed through the catalyst at the rate of approximately 500 volumes of vapor per unit volume of catalyst per hour. The gases leaving the catalyst tube are passed through condensers maintained successively at 0° C. and −60° C., and the volume of uncondensed exit gas is measured by a gas meter. Throughout the run the reaction temperature is controlled so as to maintain an evoluttion of about 2 moles of uncondensed off-gas per mole of furfural fed into the reactor. An initial temperature of about 415° C. is satisfactory for this purpose, although after several hours of operation the temperature may have to be increased slowly. The condensate is stripped of material boiling below 70° C., which is dried over calcium chloride and carefully fractionated. The fraction boiling at 31° to 32° C. is pure furan. In large scale operations it may be desirable to separate the furan from the gaseous products by a combination of cooling and compression and to dry the furan by refrigeration.

The following examples illustrate the practice of this invention in several of its preferred modifications.

*Example I*

A catalyst consisting of a mixed chromite of zinc and iron in 90:10 mole ratio is prepared as follows: 1258 grams of zinc oxide is added slowly with stirring to 2665 grams of cold 37% hydrochloric acid, and the stirred mixture is heated at 100° C. for 12 hours. After removal of the undissolved zinc oxide by filtration, the filtrate contains 12.84 moles of zinc chloride. The zinc chloride solution is combined with a solution of 398 grams of commercial ferrous sulfate and made up to 7.1 liters with distilled water. A solution of 2170 grams of neutral ammonium chromate in 7.1 liters of distilled water is added with stirring to the solution of zinc and iron salts, and the resulting slurry is neutralized by addition of 800 cc. of 28% aqueous ammonia. The precipitate which forms is removed by filtration, washed with distilled water until the washings give only a slight test of chloride ion, and dried at 110° C. The dried precipitate is then heated 4 hours at 400° C. and compressed into 3/16" pellets.

The catalyst pellets thus prepared are charged into a vertical steel tube fitted with a train of condensers which are maintained successively at 0° C. and −60° C. The catalyst is reduced in a slow stream of hydrogen at 450° C. A mixture of one volume of furfural vapors and five volumes of steam is passed through the tube at a temperature of 425° C. and at a space velocity of approximately 500 volumes of gas per unit volume of catalyst per hour. The reaction begins immediately, as evidenced by the complete disappearance of the furfural, and the formation of approximately 2 volumes of uncondensed off-gas per unit volume of furfural vapors fed into the reactor. Analysis shows the uncondensed off-gas to consist of approximately equal volumes of hydrogen and carbon dioxide. The product collected in the condenser is stripped of material boiling below 70° C., which is dried over calcium chloride and carefully redistilled. The fraction collected at 31° to 32° C. represents 85% conversion of the input furfural to pure furan.

Example II

A mixture of 1 volume of furfural vapors and 5 volumes of steam is passed through a vertical reaction tube charged with manganese chromite pellets containing potassium chromate, prepared according to the procedure of Example IV in U. S. Patent 1,829,046, and prereduced in a stream of hydrogen at 400° C. The tube is connected to a train of condensers maintained successively at 0° C. and −60° C. The furfural-steam mixture is passed over the catalyst at a space velocity corresponding to approximately 375 volumes of gas per unit volume of catalyst per hour. The catalyst is initially heated at a temperature of 400° C. and this temperature is raised as required to maintain an evolution of 2 volumes of uncondensed off-gas per unit volume of furfural vapors fed into the reactor. The product is stripped of material boiling below 75° C., which on drying and redistillation yields about half the theoretical amount of pure furan. Extraction of the aqueous residue with ether, followed by drying and distillation of the ether layer, results in recovery of about 10% of the input furfural.

Example III

A catalyst consisting of a mixed chromite of zinc and manganese in a 4:1 mole ratio is prepared as follows: A solution of 766 grams of neutral ammonium chromate in 2700 cc. of distilled water is added slowly with stirring to 2700 cc. of an aqueous solution containing 2100 grams of zinc liquor (analyzing 55.2% zinc sulfate heptahydrate) and 225 grams of manganese sulfate tetrahydrate. The resulting slurry is neutralized by addition of 330 cc. of 28% aqueous ammonia, diluted to twice its volume with distilled water, and filtered. The precipitate is dried at 110° C., ignited for 4 hours at 400° C. and compressed into 1/16" pellets.

One liter of the catalyst thus prepared is charged into a vertical steel tube equipped with an efficient vaporizer and surrounded by a liquid heat exchange medium. After reduction of the catalyst in hydrogen at 400° C. a mixture of 300 cc. per hour of furfural and 360 cc. per hour of water is pumped into the vaporizer. The products of the reaction are passed into a train of condensers maintained successively at 0° C. and −60° C. The initial reaction temperature of 420° C. is raised slowly as required to maintain an evolution of 2 moles of uncondensed off-gas per mole of input furfural. Distillation of the liquid condensate, as described in Example I, shows a conversion of 85 to 90% of the input furfural to furan.

When unreacted furfural appears in the condensers, the feed of reactants is stopped and the apparatus purged with nitrogen. A slow stream of air is passed through the catalyst bed until the original exothermic effect has disappeared, after which the catalyst is again reduced in hydrogen. A new run carried out with the catalyst reactivated in this manner gives results which are indistinguishable from those described above for the fresh catalyst. After seven such reactivation and synthesis cycles the activity of the catalyst is slightly improved over that of the fresh catalyst and the conversion of furfural to furan is still 85 to 90%.

Example IV

A mixed chromite catalyst containing approximately 85 mole per cent of iron and 15 mole per cent of cadmium is prepared as follows: A solution of 867 grams of neutral ammonium chromate in 2850 cc. of water is added slowly with stirring to a mixture of 1374 grams of ferric nitrate nonahydrate and 185 grams of cadmium nitrate tetrahydrate in 2000 cc. of water. The resulting slurry is neutralized by addition of 600 cc. of 28% aqueous ammonia, heated to 95° C. and filtered. The precipitate is washed by dispersal in 5000 cc. of water, filtered, and dried at 110° C. The dried solid is ignited at 400° C. for 4 hours and compressed into pellets.

A portion of the catalyst thus prepared is charged into a vertical steel tube and reduced in a stream of hydrogen at 450° C. A mixture of 1 volume of furfural vapor and 5 volumes of steam is passed over the catalyst at 350° to 390° C. and a space velocity of approximately 500 volumes of gas per unit volume of catalyst per hour. Purification of the product, as described in Example I, gives pure furan corresponding to 74% conversion of the furfural fed into the reactor. About 3% of the furfural is recovered by ether extraction as described in Example I.

Example V

A catalyst prepared by igniting a coprecipitated zinc-copper carbonate in 2:1 mole ratio is charged into a steel tube and reduced carefully in hydrogen. A mixture of 1 volume of furfural vapor and 5 volumes of steam is passed through the catalyst at an initial temperature of 445° C. and at a space velocity of approximately 530 volumes of gas per unit volume of catalyst per hour. Purification of the condensed product, as in Example I, yields pure furan corresponding to 66% of the furfural fed into the reactor and 15% of the furfural is recovered unchanged.

In the practice of this invention any ratio of steam to furfural may be used. Generally, however, a steam:furfural mole ratio of from 2:1 to 6:1 is preferred. Higher ratios reduced the throughput of furfural and hence the output of furan per unit of reactor space without materially improving the results obtained. Steam-furfural ratios below about 3 give important improvements over the results obtained in the absence of steam but the maximum improvement is obtained by use of higher ratios. Even smaller amounts of steam offer some advantage over the use of furfural alone.

The catalysts used in the practice of this invention contain as an essential component a dehydrogenating oxide, a mixture of dehydrogenating oxides, or a dehydrogenating oxide chemically combined with a more acidic oxide than zinc oxide, such as an oxide of chromium, molybdenum, tungsten, vanadium, and uranium. Catalysts containing substantial amounts of strongly dehydrating components are apt to lead to inferior results arising from the decomposition of the cyclic ethers (furan rings) which are the desired products of this invention.

Although it is possible to support the active catalyst components on a porous carrier such as activated charcoal, silica gel or kieselguhr, catalysts in the massive form are usually more effective. The most satisfactory catalysts are the metal chromites such as the chromites of zinc and manganese and chromites of the ferrous metals promoted with cadmium or tin. It has been found that the chromite catalysts not only give very high conversions of a furfural-steam mixture to furan and other products, but the catalysts remain in very good condition during use and have a long life in continuous operation. In addition, the initial activity of a spent catalyst can be fully restored by alternate oxidation with air and reduction with hydrogen. The useful life of a carefully reactivated catalyst in any single synthesis cycle often exceeds that of fresh catalyst so that alternate synthesis and reactivation cycles can be carried out many times with a single charge of catalyst. The presence of a small percentage of a multivalent element such as iron or manganese appears to make the reactivation of a chromite catalyst more effective.

Although the chromites of the ferrous metals, comprising nickel, cobalt and iron, may be used as catalysts for the reaction of furfural with steam the results obtained with these catalysts alone are inferior to those given by such catalysts as zinc chromite and promoted zinc chromites.

The chromites of ferrous metals when promoted with small amounts of cadmium or tin give higher conversions of furfural to furan per pass than when they are unpromoted, and such catalysts are therefore quite satisfactory. These promoted ferrous metal catalysts also have improved physical durability. This favorable modifying action of cadmium and tin and certain other elements on the ferrous metal chromites is very unusual and results in vastly improved catalysts. In general, suitable concentrations of modifying agents are in the range of 1 to 25 mole per cent of the total base metal used.

The catalysts used in the practice of this invention may be prepared by a number of different methods. Thus they may be made by mixing, grinding, igniting or coprecipitating the various catalytic components. Suitable preparative methods for representative catalysts are given in the examples. Although a number of methods are known for preparing metal chromites, a preferred method for the purpose of this invention involves precipitation of the metal cations with ammonium chromate followed by ignition of the double ammonium chromate thus formed to give a chromite of high catalytic activity. When a mixed chromite of two or more metals is desired, ammonium chromate is added to a mixture of the metal salts and the resulting mixed double ammonium chromate is ignited to give the mixed chromites. Typical preparations of ferrous metal chromites modified with cadmium or tin ore described in U. S. Patent 2,116,552. Although commercial grades of the metal oxides may be used as catalysts, oxides of greater catalytic efficiency may be prepared by the ignition of compositions such as the metal carbonates or oxalates.

The temperature to be used in operating this process depends in general upon the particular catalyst employed. Thus, some catalysts will give furan at temperatures as low as 200° C., while other catalysts such as magnesium oxide require temperatures above 500° C. to develop the most satisfactory activity. In general, when the process is operated to give a maximum conversion of furfural to furan, that temperature is chosen which will give approximately the theoretical evolution of hydrogen and carbon dioxide. As the run progresses, it may prove necessary to raise the temperature gradually so as to maintain the optimum evolution of gas. At lower temperatures some of the furfural remains unreacted, while at considerably higher temperatures excessive evolution of off-gas is obtained, probably due to decomposition of furfural. However, even under these conditions some yield of furan is obtained so that no upper limit of the temperature is known except that temperature at which the reactants and product are completely decomposed.

Although the process of this invention can be operated at pressures either higher or lower than atmospheric, operation at atmospheric pressure is preferred because excellent results are obtained with a maximum of convenience. Although many types of apparatus can be applied to operation of the process with good results, satisfactory operation is obtained in reaction tubes constructed of ordinary iron and steel. The reactor may be heated by any suitable means such as an electric furnace or liquid heat exchange bath. In large scale operation a multitubular converter heated by gas gives satisfactory results.

As many apparently widely different embodiments of this invention may be made without departing from the spirit and scope thereof, it is to be understood that this invention is not to be limited to the specific embodiments shown and described.

I claim:

1. The process for the production of furan which comprises bringing a vapor mixture of furfural and steam into contact with a catalyst consisting of a component selected from the group consisting of the dehydrogenating oxides, mixtures of dehydrogenating oxides, and dehydrogenating oxides chemically combined with an oxide of a metal which is more acidic than zinc oxide.

2. The process in accordance with claim 1 characterized in that the steam is present in amounts within the range of 2 to 6 moles per mole of furfural.

3. The process in accordance with claim 1 characterized in that the mixture of steam and furfural is passed over the catalyst heated at a temperature in excess of 200° C.

4. The process for the preparation of furan which comprises bringing a vapor mixture of furfural and steam into contact with a catalyst containing as its essential catalytic component a chromite selected from the group consisting of zinc, manganese, cadmium and tin.

5. The process for the preparation of furan which comprises bringing a vapor mixture of furfural and steam into contact with a zinc-manganese chromite catalyst.

6. The process for the preparation of furan which comprises bringing a vapor mixture of furfural and steam into contact with a zinc-iron chromite catalyst.

7. The process for the preparation of furan which comprises bringing a vapor mixture of furfural and steam into contact with a catalyst containing as its essential catalytic component a ferrous metal chromite modified with a member of the group consisting of cadmium and tin.

GERALD M. WHITMAN.